Oct. 23, 1934.  E. D. TILLYER  1,977,813
INSTRUMENT
Filed June 4, 1931
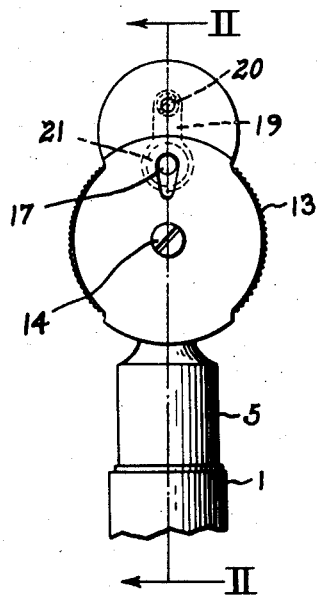
Fig. I.
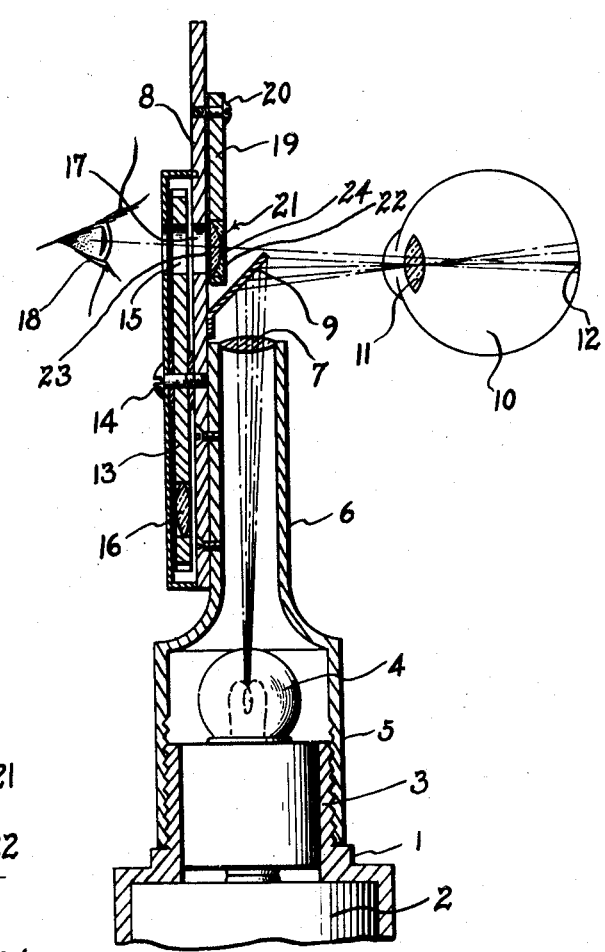
Fig. II.
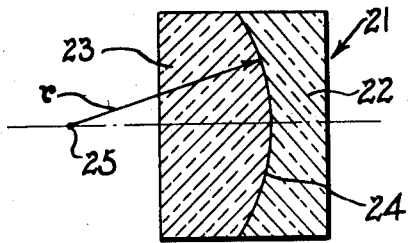
Fig. III.
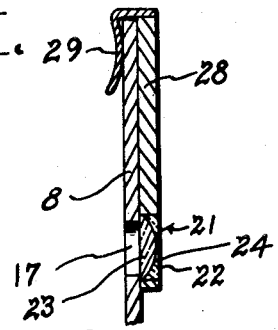
Fig. IV.
INVENTOR
Edgar D. Tillyer.
BY Harry H. Styll
ATTORNEY

UNITED STATES PATENT OFFICE 1,977,813

INSTRUMENT

Edgar D. Tillyer, Southbridge, Mass., assignor to American Optical Company, Southbridge, Mass., a voluntary association of Massachusetts Application June 4, 1931, Serial No. 542,115

2 Claims. (Cl. 88—20)

This invention relates particularly to devices for examining and measuring the eye, and more particularly refers to a means for clarifying the vision of the examiner when examining the interior of the eye.

Heretofore instruments for examining and measuring the eye have in general provided means for looking into the interior of an eye through the pupil thereof. Customarily a beam of light is directed into the pupil of the eye by means of a mirror or other means for changing direction of light rays. The observer looks into the eye either through an aperture in the mirror or past one edge thereof. A transparent mirror is sometimes used. A lens system is provided for the observer's use to enable him to focus his vision upon the retina of the observed eye, or upon any other objects which may be present within the eye. He is thus able to determine such things as the kind of an image which an object causes to be formed upon the retina, the condition of the retina, and the nature of any growths or diseased portions which may be found within the interior of the eye.

However, in all instruments which have heretofore been devised for examining any part of the interior of the eye, great difficulty has been experienced in securing a high degree of clarity of vision. This is caused, in the main, by the color dispersion properties of the transparent portions of the eye. That is, when white light, or light composed of more than one color, passes through the lens, etc., of the eye, each color which goes to make up this light is given a slightly different focus. The eye of the observer may be correctly focussed for one color but will be considerably out of focus for another. Therefore, the retina of the patient will not be sharply defined, and the picture will appear confused especially if any magnification is used between the eye of the observer and the patient's eye. Obviously, such an effect as this is highly detrimental to the ability of the observer to make a careful examination.

It is true that the observer's own eye has substantially the same properties in this respect as does the observed eye. However, the observer is accustomed to this effect in his own eye and automatically corrects his image to compensate therefore. He is not accustomed to the additional effect of the eye observed, and his vision of what lies within that eye is consequently blurred. Moreover if magnification, as by an auxiliary telescope between the observer and patient, then the effect of the patient's chromatic aberration is rapidly increased as the magnification is increased.

Heretofore also in the art of lenses, it has been well known that every convergent and every divergent lens, that is, every lens except one of zero power has the property of dispersing the various colors of a beam of light in the same manner as does the transparent matter of the eye. However, it has not been possible to introduce color dispersion into the line of vision without changing the image plane or focus. Neither has it been possible to compensate for the color dispersion of a lens or system of lenses without changing the magnifying effect thereof by the use of a lens of other than zero power.

To overcome the above and other disadvantages of the prior art is one of the objects of the present invention.

Another object is to provide a means for compensating for color dispersion occurring in a series of transparent media without changing the focus or the degree of magnification thereof.

Still another object of this invention is to eliminate the effect of the color dispersion properties of the transparent media of the eye from the present methods and apparatus for examining the eye without either increasing or decreasing the magnifying effect of such apparatus.

Still another object is to devise a method and means for examining the eye in which the effect of the color dispersion properties of the transparent media of the observed eye will not be transmitted to the observing eye.

Yet another object of this invention is to devise a method and means for examining the eye in which the effect of the color dispersion properties of the transparent media of the observed eye is compensated for between the observed eye and the observing eye.

Yet another object of this invention is to provide a lens having no focal or magnifying power but possessing substantial color dispersion properties.

Another object of this invention is to provide a lens having no focal or magnifying power but possessing predetermined color dispersion properties.

One other object of this invention is to provide a lens having no magnifying power but possessing predetermined color dispersion properties and having the outward appearance of a simple, plane glass lens.

Other objects and advantageous results of this invention will become apparent from the following specification, taken with the accompanying drawing, and it will also be clear that many changes and modifications may be made in the various parts and arrangements thereof without departing from the spirit of the invention as set forth in the appended claims. It is therefore to be distinctly understood that this invention is not limited to the exact details and arrangements of parts shown and described in said drawing and specification, as the same is by way of illustration and example only.

With the above and other objects in view such as will be apparent from the nature and terms of the annexed description and claims, my invention consists essentially of a lens formed of a plurality of lens media having the same index of refraction for at least one color of light but having different properties of color dispersion. These lens media are joined together along a surface of such shape as to give the entire lens the desired color dispersion properties, and is preferably finished on the outside so as to be of zero power. It is further a part of my invention to combine a lens of this nature with an instrument for examining the interior of the eye so as to compensate for the color dispersion properties of the transparent media of the eye.

In the drawing:

Figure I is a side elevation illustrating an eye examining instrument in which the principles of my invention have been embodied.

Figure II is an enlarged section of the instrument illustrated in Figure I, taken along the line II—II thereof and illustrating the use of the instrument.

Figure III is a detail sectional view of my improved lens for compensating for color dispersion.

Figure IV is a sectional view of a modified form of my invention which is adapted to be attached to the standard instruments now in use.

Referring now more specifically to the device illustrated in the drawing, there is shown in Figures I and II in more or less diagrammatic form, an instrument for examining the eye. This instrument consists of a hollow base portion 1 usually adapted to receive a battery 2 of the dry cell type in common use. The upper portion of this base is formed into a neck portion 3 adapted to receive the base of a small incandescent bulb 4 to be lighted by the battery 2. Obviously the bulb 4 may be lighted by any other convenient source of current as well as from the battery 2. The outer surface of the neck 3 is threaded to receive the enlarged base 5 of the tubular member 6. This member carries within its upper end a lens 7 in such position as to properly focus the light from the bulb 4.

Firmly attached to one side of the tubular member 6 and extending upwardly therefrom is a supporting plate 8 which carries the other parts of the instrument.

On the same side of the plate 8 as the tube 6 there is attached an inclined mirror 9 or other means such as have been used in the prior art extending outwardly into the path of the ray from the bulb 4 as shown. This inclined mirror is so positioned as to cast the ray of light from the bulb 4 into the pupil of the eye 10 which is to be examined. As shown, this ray passes through the lens 11 and the other transparent portions of the eye and falls upon the retina or screen 12 at the rear of the eye.

On the opposite side of the plate 8 from the mirror 9 there is rotatably mounted an apertured disk 13 by means of the screw or equivalent means 14. This disk 13 is provided with apertures about its periphery through which the examiner is accustomed to look in examining the eye illuminated by the bulb 4. One of these apertures 15 is usually left open to allow the examiner to align the instrument with the eye and this aperture is used in examining the normal eye while the remaining apertures are usually used for mounting lenses 16 of varying characteristics to accommodate the instrument to abnormal eyes and allow the examiner to focus his vision on the interior of the observed eye. As clearly illustrated in Figure II, the plate 8 is provided with an aperture 17 which registers with the apertures in the disk 13 as it is rotated. It will be noted that this aperture is just above the upper edge of the mirror 9, and that the line of sight into the observed eye is therefore almost paralleled to the ray of light entering the observed eye from the bulb 4.

Adjacent the upper edge of the plate 8 there is attached a small plate 19 by some means such as the screw 20. This plate 19 is arranged to form a mounting for the applicant's lens 21 for correcting color dispersion of the transparent media of the eye. This mounting may be either pivotal or fixed, as desired.

In Figure III there is illustrated in detail the nature of the lens 21. It will be seen that it is formed of two pieces or portions of different lens media, 22 and 23. For the purposes of this illustration the applicant has selected flint glass for the portion 22 and barium crown glass for the portion 23, although it is to be understood that different substances may be employed with equally good results. These two media, 22 and 23 are selected so as to have approximately the same index of refraction for yellow light. They do not however, have the same color dispersion properties. Because of this, the curve 24 with center 25 may be formed of such radius $r$ as to give the lens the desired degree of color dispersion without changing the focus for the mean color. This radius is selected in this case so that the color dispersion of this lens is substantially equal and opposite to that of the average eye. Thus the color dispersion of the eye is neutralized without changing the focus as seen by the observer.

In Figure IV there is shown a slight modification which is adapted to form an attachment for the instruments now in use. In this form the lens 21 is carried by a modified form of small plate 28. This plate is adapted to be secured to the support plate 8 of the ordinary instrument by means of the spring clip 29. It is thus possible by such an attachment to transform the instruments at present in use into instruments embodying the advantages of my improved instrument.

While it is not accurately known just what the color dispersion of the transparent media of the human eye is, it has been ascertained that it causes approximately one diopter difference between the focus of red and blue. In order to correct for this, it has been found that a lens of the type described constructed of the substances mentioned can be constructed which will change the focus of various lights as follows without magnifying the image: Red+0.24 diopters; yellow−0.03 diopters; blue−0.74 diopters.

It will be noted that the difference between the red and the blue for this lens is approximately one diopter. This dispersion is the exact opposite of that occurring in the eye. The curve 24 for this lens has been found to be of 5.986 mm. radius. Although such a lens cannot be made very large because of the short radius of curvature which must be employed, it finds a wide range of application in instruments, etc., where a lens of very small extent is sufficient and even desirable.

It is sometimes desirable to give a slight curvature to the outer surfaces to compensate for the total thickness of the lens system as it affects the magnification or to permit the use of glasses whose mean index is not the same.

From the foregoing it will be seen that the applicant has devised a means whereby the color dispersion caused in light passing through transparent media may be rectified or overcome without changing the size of an image viewed through such media.

It will also be appreciated that the applicant has produced a zero power lens having a predetermined amount of color dispersion.

It will further be appreciated that the applicant has devised a means whereby the color dispersion caused by the transparent media of the eye may be eliminated from the present methods of examining the interior of the eye.

Also, the applicant has produced an instrument for examining the interior of the eye which gives to the observer an image undistorted and unblurred by the natural color dispersion of the transparent media of the observed eye.

It is further apparent that many other useful and advantageous results may be produced by the present invention and that the same constitutes a distinct advance in the art.

It is to be distinctly understood that the foregoing descripion and the showing in the accompanying drawing are by way of example and illustration only, and that many other forms and embodiments thereof might be devised by one skilled in the art without departing from the spirit of this invention or the scope of the appended claims.

I claim:

1. In an eye testing instrument, a source of light, a support having a light passageway leading from said source of light, light deflecting means in line with the light passageway adapted to deflect the light rays coming from the source of light into the pupil of the eye which is to be examined, means having a sight opening adjacent the light deflecting means through which the observer may view the eye which is to be examined and transparent lens media in line with the sight opening formed of a plurality of pieces of predetermined compositions which are different from each other and having surfaces of predetermined curvatures to produce color dispersion properties which are substantially equal to and opposite those of the refracting system of the eye under examination which when the said eye is viewed through said lens media the color dispersions which are normally visible in the refracting system of an eye will be eliminated and a clear and distinct image of the interior of the eye will be obtained.

2. In an eye testing instrument, a source of light, a support having a light passageway leading from said source of light, light deflecting means in line with the light passageway adapted to deflect the light rays coming from the source of light into the pupil of the eye which is to be examined, means having a sight opening adjacent the light deflecting means through which the observer may view the eye which is to be examined and transparent lens media of substantially zero power in line with the sight opening formed of a plurality of pieces of predetermined compositions which are different from each other and having surfaces of predetermined curvatures to produce color dispersion properties which are substantially equal to and opposite those of the refracting system of the eye under examination which when the said eye is viewed through said lens media the color dispersions which are normally visible in the refracting system of an eye will be eliminated and a clear and distinct image of the interior of the eye will be obtained.

EDGAR D. TILLYER.